(12) United States Patent
Yamato et al.

(10) Patent No.: US 8,601,794 B2
(45) Date of Patent: Dec. 10, 2013

(54) APPARATUS AND METHOD FOR REGENERATING CATALYST FOR PURIFYING EXHAUST GAS

(75) Inventors: Masanori Yamato, Toyota (JP); Takeru Yoshida, Toyota (JP); Nobuyuki Takagi, Toyota (JP); Toshitaka Tanabe, Aichi-ken (JP); Yasutaka Nagai, Aichi-ken (JP); Kazuhiko Dohmae, Nissin (JP); Naoki Takahashi, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 214 days.

(21) Appl. No.: 12/599,079

(22) PCT Filed: May 9, 2008

(86) PCT No.: PCT/JP2008/058636
§ 371 (c)(1), (2), (4) Date: Jul. 12, 2010

(87) PCT Pub. No.: WO2008/140042
PCT Pub. Date: Nov. 20, 2008

(65) Prior Publication Data
US 2010/0293921 A1  Nov. 25, 2010

(30) Foreign Application Priority Data
May 9, 2007 (JP) .................. 2007-124754

(51) Int. Cl.
*F02B 27/04* (2006.01)
*F01N 3/023* (2006.01)
*F01N 3/10* (2006.01)

(52) U.S. Cl.
USPC .......... 60/286; 60/274; 60/275; 60/289; 60/300

(58) Field of Classification Search
USPC .............. 60/275, 286, 289, 300, 274
See application file for complete search history.

(56) References Cited

U.S. PATENT DOCUMENTS 5,359,228 A * 10/1994 Yoshida .................. 290/17
5,490,977 A *  2/1996 Wan et al. ............... 423/210
(Continued)

FOREIGN PATENT DOCUMENTS

| JP | 51-20090 | 2/1976 |
| JP | 2000-202309 | 7/2000 |

(Continued)

OTHER PUBLICATIONS

Chatterjee et al. "Detailed Surface Reaction Mechanism in a Three-way Catalyst", Faraday Discuss, (2001), 119, p. 371-384.*

(Continued)

*Primary Examiner* — Thomas Denion
*Assistant Examiner* — Brandon Lee
(74) *Attorney, Agent, or Firm* — Finnegan, Henderson, Farabow, Garrett & Dunner, LLP (57) ABSTRACT

A regeneration apparatus comprises a heater 2 which heats a catalyst 1 at the time of stopping fuel supply to an engine, a pump 4 which supplies an oxidizing gas or a reducing gas to the heated catalyst 1 and a switching valve 3. In the oxidizing step, catalytic poisons, for example hydrocarbon, which are absorbed on a noble metal are oxidized and removed. The particles of the noble metal become oxidized particles as pure oxide and the like. After the oxidizing step, the reducing step is carried out. In the reducing step, particles of the noble metal are reduced and re-dispersed on the support simultaneously and as a result, the particles of the noble metal become fine. Thus, a deteriorated catalyst can be regenerated without interrupting the use of catalyst and also without deteriorating the drivability.

12 Claims, 6 Drawing Sheets

(56) References Cited

U.S. PATENT DOCUMENTS

| | | | |
|---|---|---|---|
| 5,716,586 A * | 2/1998 | Taniguchi | 422/173 |
| 6,040,265 A * | 3/2000 | Nunan | 502/242 |
| 6,389,807 B1 * | 5/2002 | Suzuki et al. | 60/285 |
| 2002/0062643 A1 * | 5/2002 | Alkemade et al. | 60/300 |
| 2006/0113181 A1 * | 6/2006 | Hirata et al. | 204/173 |
| 2006/0218894 A1 * | 10/2006 | Miwa et al. | 60/277 |

FOREIGN PATENT DOCUMENTS

| | | | |
|---|---|---|---|
| JP | 2001-58121 | | 3/2001 |
| JP | 2002-282710 | | 10/2002 |
| JP | 2006112347 A | * | 4/2006 |
| JP | 2006-118500 | | 5/2006 |
| JP | 2006-299857 | | 11/2006 |
| JP | 2007-29768 | | 2/2007 |

OTHER PUBLICATIONS

Machine Translation of JP 2006112347 A.*

Snel, R., "Laboratory Reactor System for the Evaluation of Catalysts in Gas-Phase Reactions under Realistic Process Conditions," Ind. Eng. Chem. Fundam., vol. 24, (1985), pp. 257-260.

Holmgren, A. et al., "Influence of pre-treatment on the low-temperature activity of Pt/ceria," Applied Catalysis B: Environmental, vol. 22, (1999), pp. 49-61.

Liu, C. et al., "Plasma application for more environmentally friendly catalyst preparation," Pure Appl. Chem., vol. 78, No. 6, (2006), pp. 1227-1238.

Martinez, A. et al., "Influence of Mutual Platinum-Dispersed Ceria Interactions on the Promoting Effect of Ceria for the CO Oxidation Reaction in a $Pt/CeO_2/Al_2O_3$ Catalyst," J. Phys. Chem. B, vol. 102, (1998), pp. 4357-4365.

Wang, X. et al., "Deactivation Mechanisms for Pd/Ceria during the Water-Gas-Shift Reaction," Journal of Catalysis, vol. 212, (2002), pp. 225-230.

Extended European Search Report for EP Appl. No. 08752519.2 dated May 20, 2011.

Notification of the First Office Action for Chinese Appl. No. 200880015250.5 dated Nov. 28, 2011.

* cited by examiner

APPARATUS AND METHOD FOR REGENERATING CATALYST FOR PURIFYING EXHAUST GAS

CROSS-REFERENCE TO RELATED APPLICATIONS

This application is a national phase application of International Application No. PCT/JP2008/058636, filed May 9, 2008, and claims the priority of Japanese Application No. 2007-124754, filed May 9, 2007, the contents of both of which are incorporated herein by reference.

TECHNICAL FIELD

The present invention relates to an apparatus and a method for regenerating a deteriorated catalyst for purifying exhaust gas.

BACKGROUND ART

In exhaust system of automobiles, various catalysts for purifying exhaust gas, such as oxidizing catalysts, three-way catalysts and NOx storage-reduction catalysts are loaded. By these catalysts for purifying exhaust gas, harmful components in the exhaust gas are purified. In these catalysts for purifying exhaust gas, catalytic activity is developed by a noble metal, such as Pt (platinum), Rh (rhodium) or Pd (palladium). The noble metal is used under the loaded condition onto a support comprising a porous oxide, such as alumina.

In order to develop the maximum activity of the noble metal, it is preferable for the particle of the noble metal to be loaded under the high dispersion condition and as fine as possible. Therefore, the noble metals are loaded onto the support by an absorption loading method or an impregnate loading method using solution of soluble noble metal compounds, for example complex salt or nitrate. The noble metals loaded by these methods are loaded under high dispersion condition as fine particles having extreme small particle diameter. Thus, high catalytic activities can be developed.

However, there has been such a problem of catalyst deterioration that when the catalysts for purifying exhaust gas are exposed to high temperature at the time of using, the fine particles of the noble metals aggregate each other to make coarse particles resulted in the deterioration of the catalyst activities. This aggregation of the noble metal particles is easy to occur particularly in the oxidizing atmosphere. Therefore, particularly, it is problematic to the case of the lean burn engine which can restrain discharge of carbon dioxide. For these problems, the noble metals are loaded in larger quantity than that to be needed anticipating the deterioration. However, these methods need to be considered in view of the cost.

Accordingly, it is effective to regenerate a deteriorated catalyst for purifying exhaust gas. For example, Japanese Unexamined Patent Application Publication No. 2002-282,710 discloses a method of regenerating a catalyst for steam reforming reaction by supplying fuel and air to the catalyst. According to this method, the catalysts are heated to 500° C.~800° C. by the combustion of fuel. The catalysts are regenerated by reducing the noble metals under the heated condition.

However, the above-described method in No. 2002-282,710 is inefficient because the regenerating process needs to interrupt supplying fuel and steam to the catalyst and carrying out the steam reforming reaction. Moreover, the drivability may deteriorate when this method is applied to the regeneration of a catalyst for purifying exhaust gas of an automobile.

Hence, Japanese Unexamined Patent Application Publication No. 2001-058,121 discloses a regenerating apparatus and a regenerating method for regenerating a catalyst for decomposing dioxin or the like. According to this technology, a deteriorated catalyst can be regenerated by processing with ammonia type reducing agent. However, according to this technology, the use of catalyst has to be interrupted because the catalyst is taken out for regeneration. Moreover, the used catalysts are Ti-V system catalysts and noble metals are not used in No. 2001-058121.

Moreover, Japanese Unexamined Patent Application Publication No. 2006-118,500 and Japanese Unexamined Patent Application Publication No. 2006-299,857 disclose a method for regenerating a catalyst in use. However, the former is a method for regenerating by reducing NOx storage-reduction catalysts with a hydrocarbon partial oxide and is not a method for regenerating purification activities of noble metals. The latter is a method for regenerating a diesel particulate filter. It is a method for regenerating a filter by removing deposited diesel particulates and is not a method for regenerating purification activities of noble metals.

Patent document No. 1: Japanese Unexamined Patent Application Publication No. 2002-282,710;
Patent document No. 2: Japanese Unexamined Patent Application Publication No. 2001-058,121;
Patent document No. 3: Japanese Unexamined Patent Application Publication No. 2006-118,500; and
Patent document No. 4: Japanese Unexamined Patent Application Publication No. 2006-299,857

DISCLOSURE OF THE INVENTION

Assignment to be Achieved by the Invention

The present invention has been made in view of the aforementioned problems, and it is an assignment to be achieved to regenerate a deteriorated catalyst without interrupting the use of catalyst and also without deteriorating the drivability.

Means for Solving the Problem

A characteristic of the apparatus for regenerating a catalyst for purifying exhaust gas according to the present invention which solves the aforementioned problem lies in the apparatus comprising a heating means which heats the catalyst for purifying exhaust gas including a noble metal at the time of stopping fuel supply to a vehicle engine, an oxidizing gas supplying means which supplies an oxidizing gas to the catalyst for purifying exhaust gas heated by the heating means, a reducing gas supplying means which supplies a reducing gas to the catalyst for purifying exhaust gas heated by the heating means and a switching means which switches over from driving of the oxidizing gas supplying means to driving of the reducing gas supplying means and from driving of the reducing gas supplying means to driving of the oxidizing gas supplying means.

Another characteristic of an apparatus for regenerating a deteriorated catalyst for purifying exhaust gas according to the present invention lies in the apparatus comprising an oxidizing gas supplying means which supplies the oxidizing gas to the catalyst for purifying exhaust gas including a noble metal, a reducing gas supplying means which supplies a reducing gas to the catalyst for purifying exhaust gas and a plasma generator which generates discharge plasma in the oxidizing gas or in the reducing gas existing between the oxidizing gas supplying means and the reducing gas supplying means and the catalyst for purifying exhaust gas, the oxidizing gas supplying means supplying an oxidizing gas turned into plasma to the catalyst for purifying exhaust gas and then the reducing gas supplying means supplying a reducing gas turned into plasma to the catalyst for purifying exhaust gas at the time of stopping fuel supply to a vehicle engine.

Moreover, a characteristic of a method for regenerating a catalyst for purifying exhaust gas according to the present invention lies in a method at the time of stopping fuel supply to a vehicle engine comprising the steps of heating the catalyst for purifying exhaust gas including a noble metal, oxidizing the noble metal by supplying an oxidizing gas to the heated catalyst for purifying exhaust gas and reducing the noble metal under oxidized condition by supplying a reducing gas to the heated catalyst for purifying exhaust gas.

Furthermore, another characteristic of a method for regenerating a catalyst for purifying exhaust gas according to the present invention lies in a method at the time of stopping fuel supply to a vehicle engine comprising the successive steps of oxidizing a noble metal by supplying an oxidizing gas activated by a discharge plasma to a catalyst for purifying exhaust gas including the noble metal and reducing the noble metal under oxidized condition by supplying a reducing gas activated by a discharge plasma to the catalyst for purifying exhaust gas.

Effect of the Invention

In accordance with the apparatus and the method for regenerating a catalyst for purifying exhaust gas according to the present invention, a catalyst for purifying exhaust gas is regenerated at the time of stopping fuel supply to a vehicle engine. For example, when the driver's foot is released from the accelerator pedal during the high speed driving, the fuel supply to a vehicle engine is stopped by the fuel-cut control and the braking force is applied by the engine brake. If the catalyst for purifying exhaust gas is regenerated at that time, the regeneration can be carried out without affecting the drivability.

Moreover, in the case of hybrid car which uses the electric motor together with the engine, there is a driving mode in which a car is driven only by the electric motor. Under the driving mode, the fuel supply to the engine is also stopped. If the catalyst for purifying exhaust gas is regenerated under the driving mode, the regeneration can be carried out without affecting the drivability.

Moreover, because the catalyst activity of the catalyst for purifying exhaust gas is reactivated by the regenerating process, it is not necessary to load the noble metal in larger quantity for anticipating the deterioration in advance. Therefore, the loading quantity of the noble metal can be reduced. According to this, the catalyst for purifying exhaust gas can be provided at a lower cost.

Furthermore, in accordance with the apparatus and the method for regenerating a catalyst for purifying exhaust gas according to the present invention, the reducing step is carried out after the oxidizing step. In the oxidizing step, the catalytic poisons, for example hydrocarbon, which are absorbed on the noble metal are oxidized and removed. The particles of the noble metal become oxidized as pure oxide and the like. In order to carry out the reducing step after that, the particles of the noble metal are reduced and are re-dispersed on the support simultaneously and as a result, the particles of the noble metal become fine. Owing to this, the catalyst activity is reactivated.

For example, when the catalyst in which Pt is loaded on $CeO_2$ is treated by the oxidizing gas at a predetermined temperature, Pt is oxidized and solid phase reaction occurs between Pt and $CeO_2$ resulting in that the surface of $CeO_2$ is wetted by a Pt component. After that, when these catalysts are treated by the reducing gas at a predetermined temperature, Pt is re-precipitated as metal particles by reducing reaction. At that time, because the affinity between Pt and $CeO_2$ is high, it is considered that the reducing reaction progresses gradually from the surface of the Pt component wetted on the surface of $CeO_2$ and Pt metal is precipitated as fine particle. According to this, Pt particles are re-dispersed as fine particles and the catalyst activity is reactivated.

Therefore, in accordance with the apparatus and the method for regenerating a catalyst for purifying exhaust gas according to the present invention, a catalyst for purifying exhaust gas can be regenerated in a short period of time with high efficiency of regeneration. Furthermore, if an oxidizing gas and a reducing gas are activated by discharge plasma and then these gases are supplied to a catalyst for purifying exhaust gas, regeneration at room temperature can be carried out. Therefore, a heating means is not needed and the cost can be further saved.

| Explanation on Reference Numerals | |
|---|---|
| 1: | Catalyst For Purifying Exhaust Gas; |
| 2: | Heater; |
| 3: | Valve; |
| 4: | Pump; |
| 5: | Sensor; and |
| 6: | Control Apparatus |

BEST MODE FOR CARRYING OUT THE INVENTION

An apparatus for regenerating according to the present invention comprises a heating means, an oxidizing gas supplying means, a reducing gas supplying means, and a switching means. The heating means can heat a catalyst for purifying exhaust gas at the time of stopping fuel supply to an engine, that is, the time when the catalyst is not heated by exhaust gas. As heating means, it is possible to use an electric heater and the like. Furthermore, a catalyst for purifying exhaust gas with a heater attached may be used. A catalyst for purifying exhaust gas can be heated directly. Moreover, an oxidizing gas and a reducing gas can be heated instead of heating a catalyst for purifying exhaust gas directly. Thus, the catalyst for purifying exhaust gas can be heated indirectly.

The time of stopping fuel supply to an engine can be the time when vehicles stop or park, the fuel-cut time at driving with a high speed or the time when a hybrid car is driven only by the electric motor.

The oxidizing gas supplying means is a means which supplies an oxidizing gas to the catalyst for purifying exhaust gas heated by the heating means. Here, an oxidizing gas is a gas which can oxidize noble metals in the heated catalyst for purifying exhaust gas, and the gas including 2% or more oxygen, preferably the gas including 5% or more oxygen can be used. Air existing affluently on the earth can be used.

In the oxidizing step, the catalyst for purifying exhaust gas is preferably heated to 400° C.~800° C. by the heating means. When the temperature of the catalyst for purifying exhaust gas is below 400° C., efficient energy to re-disperse by oxidizing the noble metals may not be obtained. As a result, it is difficult to re-disperse noble metals. Moreover, when the temperature is above 800° C., because the heat energy is larger than reciprocal action between the support and the noble metals, granular growth of the noble metal is extraordinary. As a result, it is difficult to re-disperse even though the reducing step is carrying out. More preferably, the catalyst for purifying exhaust gas is heated in a range of 550° C.~800° C.

The reducing gas supplying means is a means which supplies a reducing gas to the catalyst for purifying exhaust gas heated by the heating means after supplying the oxidizing gas. Here, a reducing gas is the gas which reduces oxidized noble metals to noble metals. Fuel such as gasoline, CO, HC, $NH_3$, $H_2$ and the like can be exemplified as a reducing gas. Among these, CO, $H_2$, light HC and $NH_3$ are more preferable.

It is preferable that in the reducing step, the catalyst for purifying exhaust gas is heated to 100° C. or above by the heating means. When the temperature of the catalyst for purifying exhaust gas is below 100° C., it is difficult to reduce oxidized noble metals to noble metals. Accordingly, regenerating the catalyst becomes difficult. It is more preferable to heat the catalyst to 300° C. or above. An electric pump, an injector and equivalents thereof can be used for the oxidizing gas supplying means and the reducing gas supplying means. For example, the oxidizing gas supplying means takes air in and supplies the air to the catalyst for purifying exhaust gas. Furthermore, the reducing gas supplying means supplies fuel, urea solution, hydrogen gas or ammonia gas from respective tank or cylinder to the catalyst for purifying exhaust gas.

Furthermore, it is preferable to supply an oxidizing gas or a reducing gas to the catalyst for purifying exhaust gas utilizing the rotation of a vehicle wheel or the reverse-driving power when the engine is reverse-driven by rotation of the vehicle wheel at the time of stopping fuel supply. This may reduce the consumption of electric power, compared with using an electric pump.

The process time in the oxidizing step differs depending on the oxygen level in the oxidizing gas and the heating temperature of the catalyst for purifying exhaust gas, but usually the process time in the oxidizing step is about tens of seconds in the case that an air is used as the oxidizing gas. The process time in the reducing step differs depending on the type of the reducing gas or the heating temperature of the catalyst for purifying exhaust gas. Therefore, it is preferable to carry out the reducing step for only the time needed for regeneration. Such desirable time for reducing step can be obtained in advance by researching the relation between the heating temperature of the catalyst for purifying exhaust gas and the reduced degree according to the type of the reducing gas to be used, by experiments.

It is preferable to carry out the oxidizing step and the reducing step continuously in order. Under the oxidizing condition, purification performance of the noble metal is not obtained sufficiently.

According to another regenerating apparatus of the present invention, a plasma generator is used, which generates discharge plasma in the oxidizing gas and the reducing gas existing between the oxidizing gas supplying means and the reducing gas supplying means, and the catalyst for purifying exhaust gas. The reactivity improves by the oxidizing gas and the reducing gas activated by the discharge plasma, and the noble metal can be oxidized even under the room temperature and also the noble metal under the oxidized condition can be reduced to the noble metal under the room temperature. Therefore, the heating means becomes unnecessary and the electric energy can be saved.

The plasma generator is generally constituted to generate a discharge plasma according to the application of the high voltage of 5 kV~50 kV. Corona discharge generator, barrier discharge generator, inductively coupled plasma generator, arc discharge generator and the like can be used for plasma generator. Direct-current voltage, alternating voltage, alternating pulse voltage and the like can be used for a high voltage generator. For example, it is possible to activate the oxidizing gas and the reducing gas flowing within the flow path when one or more pairs of electrodes are formed in the flow path of the exhaust gas to generate plasma by discharging between the electrodes. The shape of the electrode is not limited to any particular shape. However, it is preferable to have the shape which is easy to discharge such as for example fine line shape, needle shape, edge shape and the like. It is also preferable to cover the electrode with dielectric.

In the case using a plasma generator, ozone, OH radical, NO and the like can be used in addition to the gas including 2% or more oxygen, the gas including 5% or more oxygen, and air as an oxidizing gas. Moreover, as a reducing gas, N radical, H radical and the like can be used in addition to fuel such as gasoline, CO, HC, $NH_3$, $H_2$ and the like. Ozone, OH radical, NO, N radical and H radical may exist before discharge and may be generated after generating of discharge plasma.

Oxidizing catalysts, three-way catalysts, NOx storage-reduction catalysts and the like can be used as the catalyst for purifying exhaust gas in the present invention. Alumina, titania, ceria, zirconia, ceria-zirconia solid solutions and the like are exemplified as the support. It is preferable to include at least ceria in the support. Furthermore, Pt, Rh, Pd, Ir (iridium) and the like are exemplified as noble metal loaded onto the support. It is preferable to include at least Pt as a noble metal. The reason is that in the case of Pt loaded onto the support including ceria, the effect of the present invention is remarkable. Moreover, the loading quantity of the noble metal in the catalyst for purifying exhaust gas is not limited to any particular quantity. The general loading quantity can be used.

EXAMPLES

Hereinafter, the present invention will be explained concretely by means of the examples and the comparative examples.

<Preparation of Pellet Catalyst>

$CeO_2$—$ZrO_2$ solid solutions powder ($CeO_2$:$ZrO_2$=60:40 in weight ratio) was prepared and a predetermined amount of diamine dinitro platinum solution in a predetermined concentration was impregnated to the $CeO_2$—$ZrO_2$ solid solutions powder. Thereafter, this was dried at 120° C. and calcined at 500° C. for 2 hours, thereby preparing a Pt/$CeO_2$—$ZrO_2$ catalyst powder on which 1 mass (weight) % of Pt was loaded. This Pt/CeO$_2$—ZrO$_2$ catalyst powder was pelletized by a conventional method, thereby preparing a pellet catalyst. This pellet catalyst was used in the regeneration process described below.

Example No. 1

The pellet catalyst described above was put into a cannulated furnace. Nitrogen durability test was carried out, in which the pellet catalysts are held under the nitrogen gas atmosphere for 5 hours at 950° C. and 1000° C., respectively. The catalysts after the nitrogen durability test were subjected to the oxidizing step where the catalysts are held for 2 hours at 400° C., 600° C. and 800° C., respectively and then the respective oxidized catalysts were subjected to the reducing step where the oxidized catalysts are held for 15 minutes at 500° C. in nitrogen gas including 3 volume % H$_2$.

Comparative Example No. 1

The respective catalysts after nitrogen durability test carried out in the same manner as Example No. 1 were not subjected to the oxidizing step. And then the reducing step was only carried out for the respective catalysts in the same manner as Example No. 1.

Example No. 2

The pellet catalyst described above was put into a cannulated furnace. RL durability test was carried out, in which the pellet catalysts are held under the atmosphere which is repeating rich gas atmosphere (CO: 2%, N$_2$: balance) and lean gas atmosphere (O$_2$: 5%, N$_2$: balance) for each 120 seconds alternately, for 5 hours at 1000° C. The oxidizing step were carried out the catalysts after RL durability test, where the catalysts are held for 2 hours at 600° C. in air and then the reducing step were carried out the oxidized catalysts, where the oxidized catalysts are held for 15 minutes at 500° C. in nitrogen gas including 3 volume % H$_2$.

Comparative Example No. 2

The catalysts after RL durability test carried out in the same manner as Example No. 2 were not subjected to the oxidizing step. And then the reducing step was only carried out the catalysts in the same manner as Example No. 2.

Example No. 3

The pellet catalyst described above was put into an electric furnace. Air durability test was carried out, in which the pellet catalysts are held under the air for 5 hours at 1000° C. The catalysts after air durability test were subjected to the oxidizing step where the catalysts are held for 2 hours at 600° C. in air and then the oxidized catalysts were subjected to the reducing step where the oxidized catalysts are held for 15 minutes at 500° C. in nitrogen gas including 3 volume % H$_2$.

Comparative Example No. 3

The catalysts after air durability test carried out in the same manner as Example No. 3 were not subjected to the oxidizing step. And then the reducing step was only carried out the catalysts in the same manner as Example No. 3.

Experimental Example No. 1

1 (one) gram of the respective catalysts regenerated according to Example Nos. 1~3 and Comparative Example Nos. 1~3 was filled into the respective silica tubes in the tubular furnace. While the model gas indicated in Table 1 was flowed through the catalysts at a rate of 10 L/min, the catalysts were heated to 100° C.~500° C. at a temperature rise rate of 20° C./min in the tubular furnace. HC purification rate during this period was measured continuously and the temperature for purifying 50% of HC was measured respectively. The results are given in Table 2 and FIG. 1.

TABLE 1

| CO (%) | C$_3$H$_6$ (ppm) | NO (ppm) | CO$_2$ (%) | O$_2$ (%) | H$_2$O (%) | N$_2$ |
|---|---|---|---|---|---|---|
| 0.65 | 1000 | 1500 | 10 | 0.7 | 5 | balance |

TABLE 2

| | Durabilty Test Temperature | Temperature at Oxidizing step | Temperature for purifying 50% of HC |
|---|---|---|---|
| Ex. No 1 | 950° C. | 400° C. | 217° C. |
| | | 600° C. | 208° C. |
| | | 800° C. | 214° C. |
| Comp. Ex. No 1 | 950° C. | — | 241° C. |
| Ex. No 1 | 1000° C. | 400° C. | 230° C. |
| | | 600° C. | 218° C. |
| | | 800° C. | 220° C. |
| Comp. Ex. No. 1 | 1000° C. | — | 242° C. |
| Ex. No 2 | 1000° C. | 600° C. | 285° C. |
| Comp. Ex. No 2 | 1000° C. | — | 307° C. |
| Ex. No 3 | 1000° C. | 600° C. | 249° C. |
| Comp. Ex. No 3 | 1000° C. | — | 273° C. |

Figure 1:
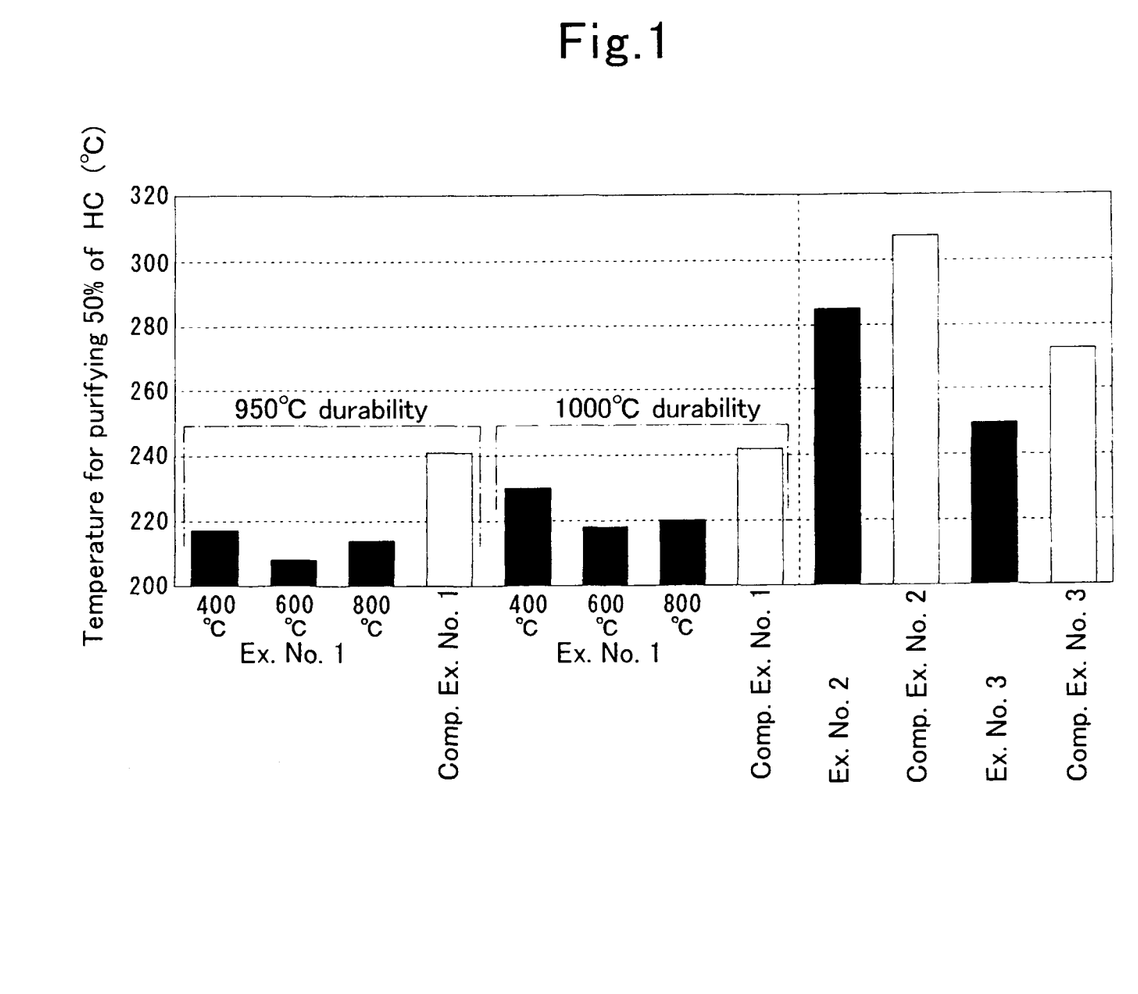
FIG. 1 is a graph for illustrating temperature of purifying 50% of HC.

From Table 2 and FIG. 1, it is understood that the activity of purification of the catalyst according to Example No. 1 was superior compared with the catalyst according to Comparative Example No. 1. That is, it is apparent that the catalyst deteriorated at the nitrogen durability test was regenerated by carrying out the oxidizing step and the reducing step.

Moreover, the activity of purification of the catalyst according to Example No. 2 was superior compared with the catalyst according to Comparative Example No. 2 and the activity of purification of the catalyst according to Example No. 3 was superior compared with the catalyst according to Comparative Example No. 3. That is, even if the conditions of the durability test are different, it is apparent that the catalyst deteriorated at the durability test was regenerated by carrying out the oxidizing step and the reducing step.

Furthermore, in Example No. 3, air durability test in which catalysts are held under the air for 5 hours at 1000° C. was similar to that in Comparative Example No. 3. The difference between Comparative Example No. 3 and Example No. 3 is whether the oxidizing step (the catalysts are held under the air for 2 hours at 600° C.) was carried out or not. However, because the regeneration of the catalysts in Example No. 3 was progressed compared with that in Comparative Example No. 3, it is suggested that the oxidizing step is preferably carried out below 1000° C.

<Preparation of the First Honeycomb Catalyst>

A honeycomb substrate, which was made of cordierite (cell density: 600 cpsi, wall thickness: 75 μm, diameter: 103 mm, length: 105 mm, 0.875 L), was prepared. The slurry, which includes 120 parts by mass of Pt/CeO$_2$—ZrO$_2$ catalyst powder similar to that obtained at the preparation of the pellet catalyst, and 10 parts by mass of a ceria sol binder, was wash-coated onto the honeycomb substrate and then the honeycomb catalyst was prepared. In the coating layer, 120 g of Pt/CeO$_2$—ZrO$_2$ catalyst powder per 1 L of honeycomb catalyst was included and 0.6 g of Pt was loaded per 1 L of honeycomb catalyst.

Example No. 4

The first honeycomb catalyst described above was fit onto an exhaust system of a 4.3-L gasoline engine. The actual durability test was conducted for 50 hours under a condition that the catalyst-bed temperature is 750° C. and 3-second fuel cut control and 7-second feed back control are repeated alternately. The 7-second feed back control is controlled under stoichiometry atmosphere of A/F=14.6, wherein A/F means air-fuel ratio.

Furthermore, the fuel cut control is the control in which fuel supply to the engine is cut under the condition that the vehicle wheel is rotating. During the fuel cut control, only the air is exhausted from the engine and no exhaust gas is exhausted from the engine. Moreover, the feed back control controls the air-fuel ratio within a predetermined range by controlling a fuel supply amount through detection of oxygen level in the exhaust gas. The exhaust gas atmosphere in this case changes a few to rich atmosphere or lean atmosphere referencing stoichiometry atmosphere.

The catalysts after the actual durability test described above were subjected to the oxidizing step for holding for 2 hours at 800° C. in the air, and then the oxidized catalysts were subjected to the reducing step for holding for 1 hour at 700° C. in nitrogen gas including 3 volume % CO.

Comparative Example No. 4

The first honeycomb catalyst described above was fit onto an exhaust system of a engine similar to that in Example No. 4 and the actual durability test was carried out in the manner similar to that in Example No. 4. The oxidizing step and the reducing step were not carried out.

<Preparation of the Second Honeycomb Catalyst>

CeO$_2$—ZrO$_2$ solid solutions powder (CeO$_2$:ZrO$_2$=60:40 in weight ratio) was prepared and a predetermined amount of barium acetate aqueous solution in a predetermined concentration was impregnated to the CeO$_2$—ZrO$_2$ solid solutions powder. Thereafter this was dried at 120° C. and calcined at 500° C. for 2 hours, thereby 0.71 mass (weight) % of Ba was loaded. After that, a predetermined amount of diamine dinitro platinum solution in a predetermined concentration was impregnated. Thereafter this was dried at 120° C. and calcined at 500° C. for 2 hours, thereby 0.5 mass (weight) % of Pt was loaded. Then Pt—Ba/CeO$_2$—ZrO$_2$ catalyst powder was prepared.

On the other hand, a honeycomb substrate, which was made of cordierite (cell density: 600 cpsi, wall thickness: 75 μm, diameter: 103 mm, length: 105 mm, 0.875 L), was prepared. The slurry, which includes 120 parts by mass of Pt—Ba/CeO$_2$—ZrO$_2$ catalyst powder and 10 parts by mass of a ceria sol binder was wash-coated onto the honeycomb substrate and then the honeycomb catalyst was prepared. In the coating layer, 120 g of Pt—Ba/CeO$_2$—ZrO$_2$ catalyst powder per 1 L of honeycomb catalyst was included and 0.6 g of Pt was loaded per 1 L of honeycomb catalyst.

Example No. 5

The second honeycomb catalyst described above was fit onto an exhaust system of an engine similar to that in Example No. 4 and the actual durability test was conducted in the manner similar to that in Example No. 4. The catalyst after the actual durability test was subjected to 2 cycles of 6-second fuel cut control under a condition that the catalyst-bed temperature is 750° C. (an oxidizing step) and 54-second feed back control for controlling A/F under stoichiometry atmosphere of A/F=14.6 (a reducing step), wherein A/F means air-fuel ratio.

Comparative Example No. 5

The second honeycomb catalyst described above was fit onto an exhaust system of an engine similar to that in Example No. 4 and the actual durability test was carried out in the manner similar to that in Example No. 4. The oxidizing step and the reducing step were not carried out.

Experimental Example No. 2

The respective catalysts regenerated according to Example Nos. 4, 5 and Comparative Example Nos. 4, 5 were fit onto an exhaust system of an in-line, 4-cylinder, 2.4-L gasoline engine and were burnt at theoretical air-fuel ratio until the catalyst-bed temperature became 500° C. after starting the engine. After that, the temperature of the gas flowing into the catalysts was risen from 200° C. to 450° C. at a temperature rise rate of 10/min by using a heat exchanger. HC purification rate during the temperature changes was measured continuously and the temperature for purifying 50% of HC was measured. The results are given in Table 3 and FIG. 2.

TABLE 3

| | Durabilty Test Temperature | Temperature at Oxidizing step | Temperature for purifying 50% of HC |
|---|---|---|---|
| Ex. No. 4 | 750° C. | 800° C. | 361° C. |
| Comp. Ex. No 4 | 750° C. | — | 430° C. |
| Ex. No 5 | 750° C. | 750° C. | 421° C. |
| Comp. Ex. No 5 | 750° C. | — | 438° C. |

Figure 2:
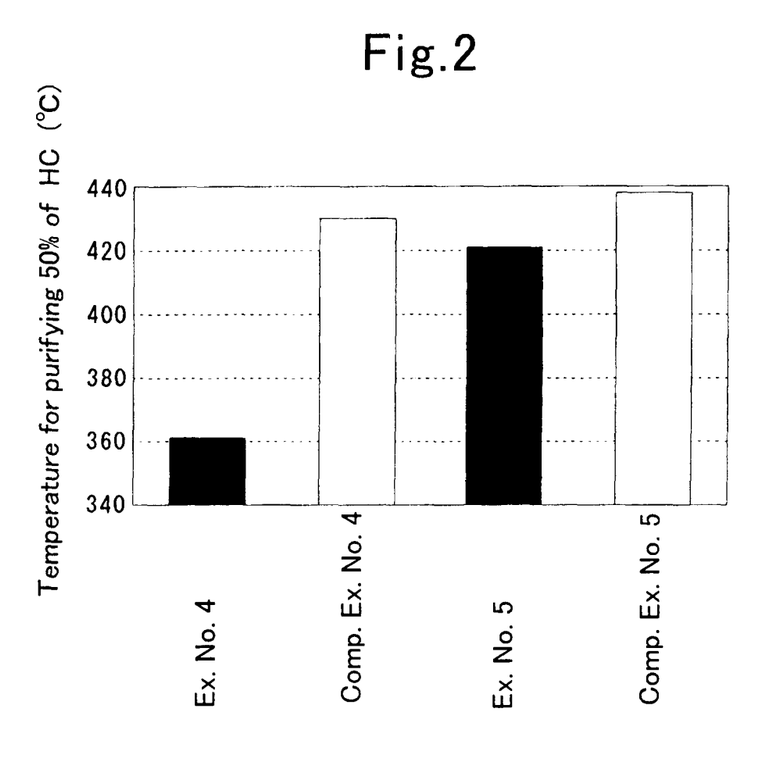
FIG. 2 is a graph for illustrating temperature of purifying 50% of HC.

From Table 3 and FIG. 2, it is understood that the activity of purification of the catalyst according to Example No. 4 was superior compared with the catalyst according to Comparative Example No. 4 and the activity of purification of the catalyst according to Example No. 5 was superior compared with the catalyst according to Comparative Example No. 5. That is, it is apparent that the catalyst deteriorated at the durability test was regenerated by carrying out the oxidizing step and the reducing step.

Example No. 6

The first honeycomb catalyst described above was fit onto an exhaust system of an engine similar to that in Example No. 4 and the actual durability test was conducted in the manner similar to that in Example No. 4.

The test pieces having 30 mm in diameter and 50 mm in length were cut from the first honeycomb catalyst after the actual durability test. These test pieces were subjected to the oxidizing step where the test pieces are held for 10 seconds, 30 seconds, 60 seconds, 120 seconds, 180 seconds, 600 seconds, respectively at 700° C. in nitrogen gas including 8 volume % O$_2$. Continuously, the test pieces were subjected to the reducing step where the test pieces are held for 10 minutes at 450° C. in the rich model gas indicated in Table 4.

TABLE 4

| CO (%) | $C_3H_6$ (% C) | NO (%) | $CO_2$ (%) | $O_2$ (%) | $H_2O$ (%) | $N_2$ |
|---|---|---|---|---|---|---|
| 0.7 | 0.16 | 0.12 | 8 | 0.6465 | 3 | balance |

Comparative Example No. 6

The first honeycomb catalyst described above was fit onto an exhaust system of an engine similar to that in Example No. 4 and the actual durability test was carried out in the manner similar to that in Example No. 4.

The test pieces having 30 mm in diameter and 50 mm in length were cut from the first honeycomb catalyst after the actual durability test. These test pieces were subjected to the reducing step where the test pieces are held for 10 minutes at 450° C. in the rich model gas indicated in Table 4. That is, except that the oxidizing step was not carried out, it was in the same manner as that of Example No. 6.

Experimental Example No. 3

The respective catalysts regenerated according to Example No. 6 and Comparative Example No. 6 were fit onto an exhaust system of an in-line, 4-cylinder, 2.4-L gasoline engine and the temperature for purifying 50% of HC was measured in the same manner in that of Experimental Example No. 2. The results are given in FIG. 3.

Figure 3:
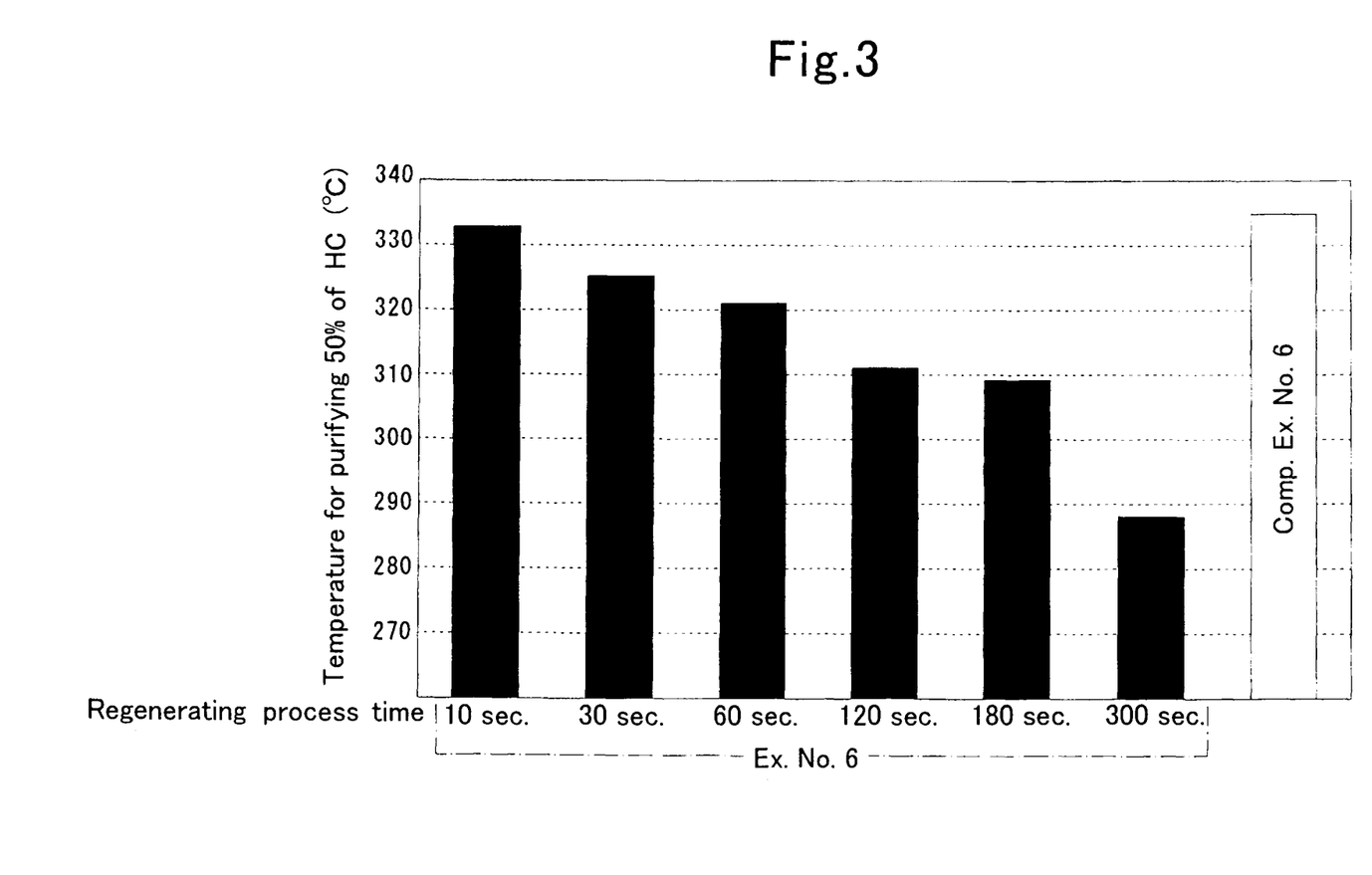
FIG. 3 is a graph for illustrating temperature of purifying 50% of HC.

From FIG. 3, it is understood that the activity of purification of the catalyst according to Example No. 6 was superior compared with the catalyst according to Comparative Example No. 6. That is, it is apparent that the catalyst deteriorated at the actual durability test was regenerated by carrying out the oxidizing step and the reducing step. And it is also apparent that the longer the process time in the oxidizing step was the higher the activity of purification became and the oxidizing step was essential before the reducing step.

Example No. 7

Figure 4:
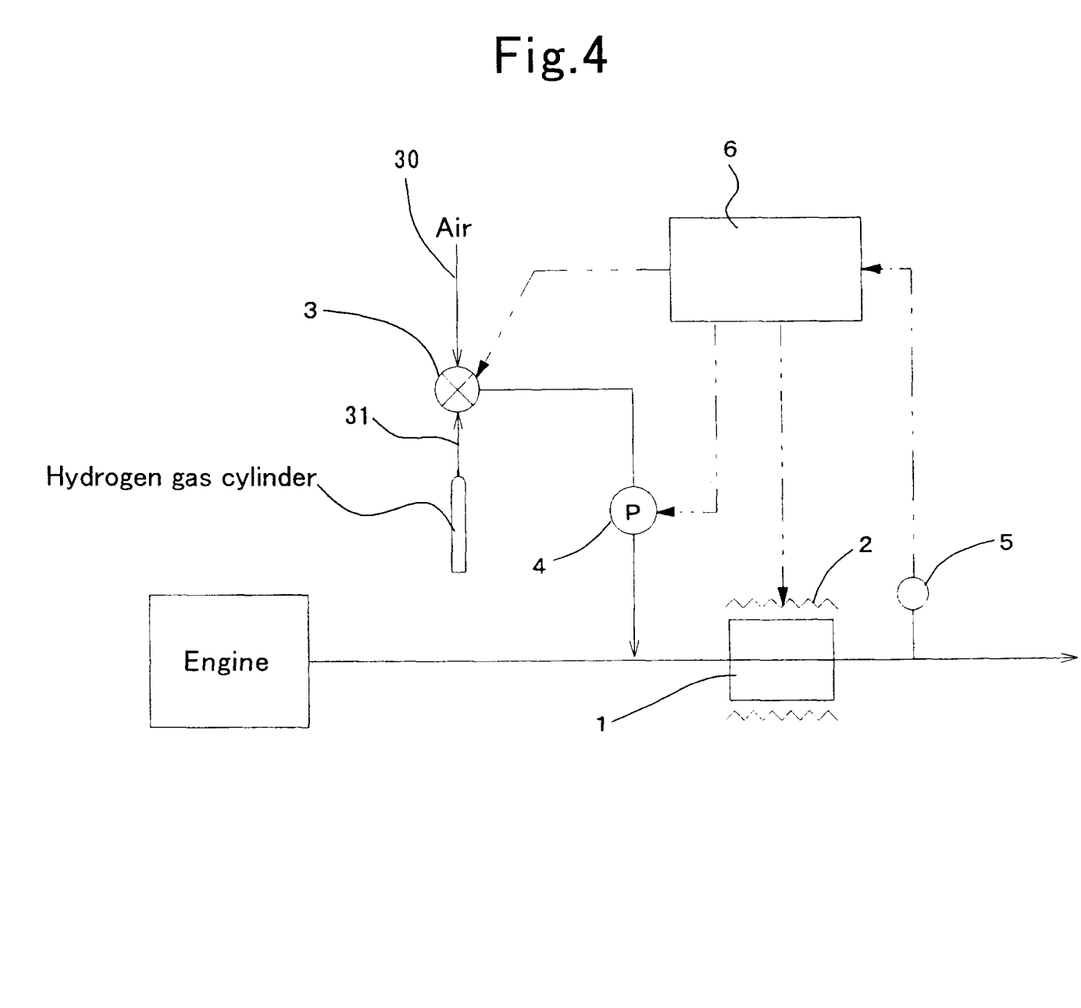
FIG. 4 is a block diagram of a regenerating apparatus that is directed to an example according to the present invention.

A block diagram of a regenerating apparatus that is directed to the examples according to the present invention is given in FIG. 4. This regenerating apparatus comprises a catalyst 1 for purifying exhaust gas set onto an exhaust system, a heater 2 as a heating means disposed around the catalyst for purifying exhaust gas, a valve 3, a pump 4 disposed between the valve 3 and an exhaust pipe, a sensor 5 which is detecting outlet gas atmosphere from the catalyst 1 for purifying exhaust gas and is disposed downstream side of the catalyst 1 for purifying exhaust gas and a control apparatus 6.

The valve 3 is connected to an air introducing pipe 30 one end of which is opened to the air through an air filter (not shown). The valve 3 is connected to a hydrogen introducing pipe 31 one end of which is connected to a hydrogen cylinder. One of the air introducing pipe 30 and the hydrogen introducing pipe 31 is connected to the pump 4. The pump 4 supplies air or hydrogen which is supplied from the air introducing pipe 30 or the hydrogen introducing pipe 31 to an exhaust pipe at upstream side of the catalyst 1 for purifying exhaust gas.

A control apparatus 6 comprises ECU and controls the heater 2, the valve 3 and the pump 4 by detecting the driving condition of the vehicle and the value of the sensor 5. Hereinafter, the control operation of the control apparatus 6 will be explained by means of the flowchart indicated in FIG. 5.

Figure 5:
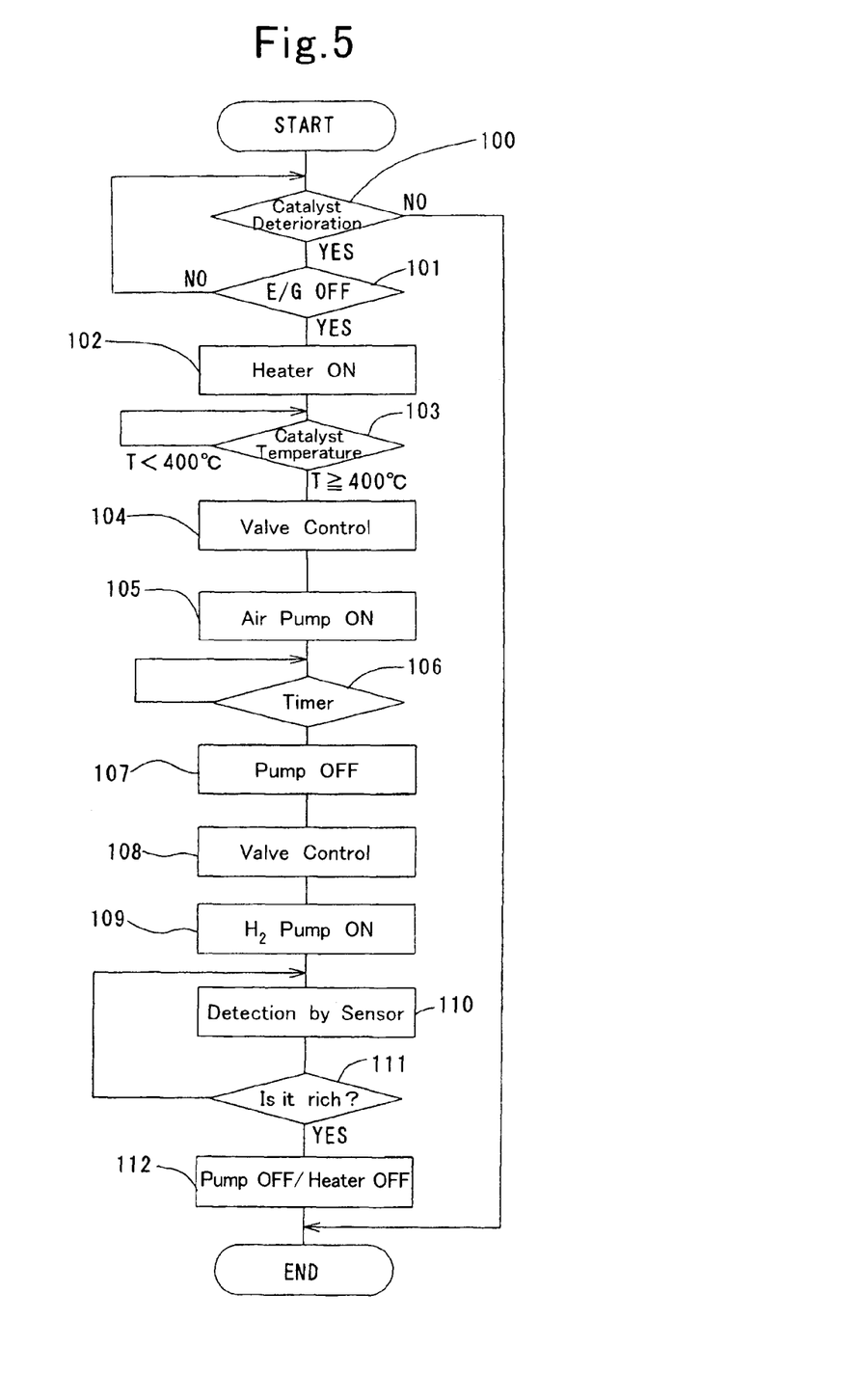
FIG. 5 is a flow chart for illustrating control of a regenerating apparatus that is directed to the example according to the present invention.

First, in step 100, the driving record of the engine is investigated and the deterioration degree of the catalyst 1 for purifying exhaust gas is investigated from the relation between the temperature of the exhaust gas and the flow time of the exhaust gas. In the case when the deterioration degree of the catalyst 1 for purifying exhaust gas is judged to be too small to proceed with the regenerating process, the regenerating process is not carried out. However, in the case when the deterioration is judged to be progressed and the regenerating process is judged to be necessary, the process described below will be carried out.

In step 101, whether the fuel is supplying to an engine or not is investigated. In the case that the engine is driven, the regeneration process is not carried out with returning to step 100. In the case that the fuel is not supplied to the engine, the catalyst 1 for purifying exhaust gas is heated by energizing the heater 2 in step 102.

Then, in step 103, when the temperature of the catalyst for purifying exhaust gas is detected to be 400° C. or more, the valve 3 is controlled in step 104 to establish communication between the air introducing pipe 30 and the pump 4. After that, the pump 4 becomes ON in step 105 and air is supplied to the catalyst 1 for purifying exhaust gas through the valve 3 from the air introducing pipe 30. Thus, the oxidizing step is carried out.

In step 106, when the oxidizing step is judged to be carried out for a predetermined time, the pump 4 becomes OFF in step 107. Then in step 108, the valve 3 is controlled to establish communication between the hydrogen introducing pipe 31 and the pump 4. After that, in step 109, the pump 4 becomes ON again and hydrogen gas is supplied to the catalyst 1 for purifying exhaust gas through the valve 3 from the hydrogen introducing pipe 31. Thus, the reducing step is carried out.

In step 110, the output value of the sensor 5 is input to the control apparatus 6. In step 111, the outlet gas atmosphere from the catalyst 1 for purifying exhaust gas is investigated. In the case that the outlet gas atmosphere from the catalyst 1 for purifying exhaust gas is not a reducing atmosphere, the process is returned to step 111 again because the reducing step is not sufficiently carried out. In the case that the outlet gas atmosphere from the catalyst 1 for purifying exhaust gas is reducing atmosphere, the reducing step is judged to be completed and in step 112, the heater 2 becomes OFF and the pump 4 becomes OFF.

According to these regenerating process described above, the noble metals of the catalyst 1 for purifying exhaust gas are re-dispersed and the purification activities of the catalyst 1 for purifying exhaust gas are reactivated. Thus, these regenerating processes are carried out under the condition that the fuel supply to the engine is stopped, for example, at the time when vehicle parks, at the time of fuel-cut when the vehicle is driving with a high speed, at the time when a hybrid car is driven by only the electric motor, or at the time of start-up. Because of that, a deteriorated catalyst can be regenerated without interrupting the use of catalyst and also without deteriorating the drivability.

Example No. 8

Figure 6:
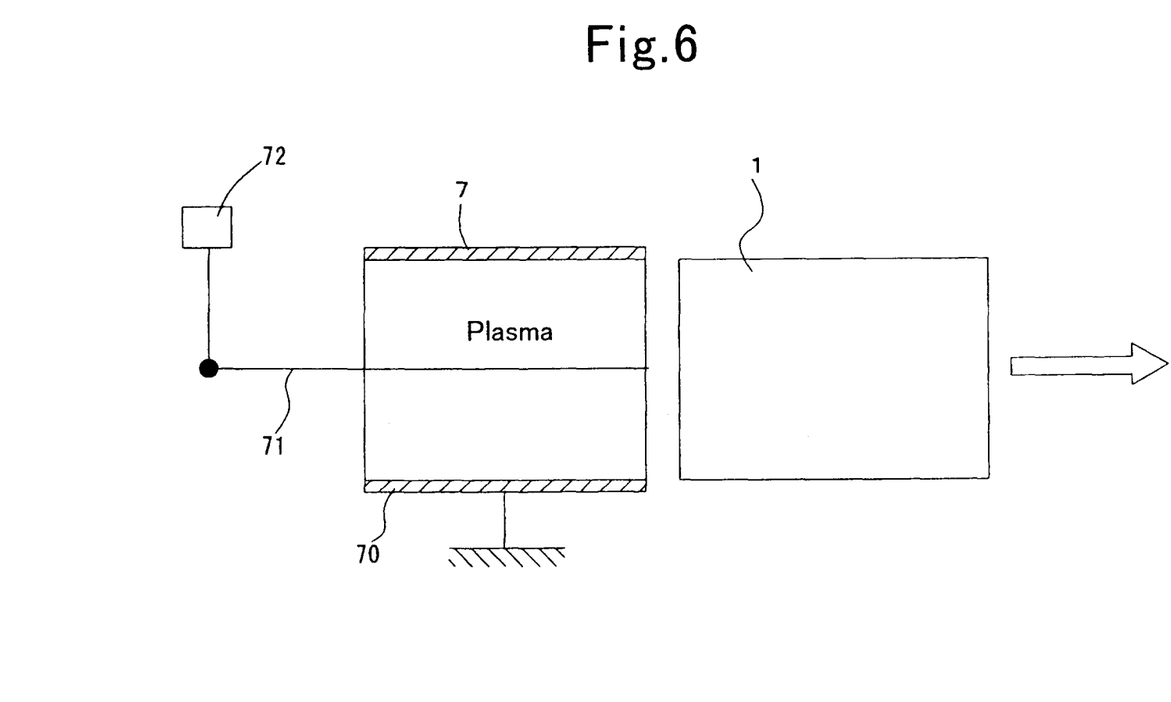
FIG. 6 is a schematic sectional view for illustrating a feature of an apparatus for regenerating that is directed to another example according to the present invention.

In FIG. 6, a feature of a regenerating apparatus that is directed to the examples according to the present invention is illustrated. This regenerating apparatus comprises similar construction to that in Example No. 7 except that a plasma generator 7 is disposed on the upstream side of the catalyst 1 for purifying exhaust gas and on the downstream side of the pump 4. The heater 2 is not used in FIG. 6. In other words, in FIG. 6, only the plasma generator 7 and the catalyst 1 for purifying exhaust gas are illustrated.

The plasma generator 7 comprises a cylinder electrode 70 which is made of conductive metal and has φ17 mm in inner diameter and 10 mm in length and a center electrode 71 having a needle shape with 1 mm in outer diameter. The center electrode 71 is disposed in the center of the cylinder electrode 70. The cylinder electrode 70 serves as an earth potential. The center electrode 71 is composed so that high voltage of rectangular pulse waveform from a high voltage power supply 72 can be applied with 14.5 kv and 200 Hz.

That is, in accordance with the regenerating apparatus shown in FIG. 6 according to the present invention, a discharge plasma is generated in the plasma generator 7 by applying high voltage power supply to the center electrode 71 under the condition that air or hydrogen gas is supplied to the catalyst 1 for purifying exhaust gas. Then, when the discharge plasma contacts oxygen or hydrogen, active species, such as for example, radicals or ions and the like are generated. When these active species contact the catalyst 1 for purifying exhaust gas, the oxidation or the reduction of the loaded noble metal progresses even under the room temperature.

Therefore, in accordance with the regenerating apparatus shown in FIG. 6 according to the present invention, even if the heater 2 is not used, the catalyst 1 for purifying exhaust gas can be regenerated under the room temperature. Therefore, the consumption of electric power can be largely saved, compared with the regenerating apparatus indicated in Example No. 7.

The invention claimed is:

1. An apparatus for regenerating a catalyst for purifying exhaust gas, comprising:
   a heater which heats said catalyst for purifying exhaust gas including a noble metal at the time of stopping fuel supply to a vehicle engine;
   an oxidizing gas supplying portion which supplies an oxidizing gas to said catalyst for purifying exhaust gas heated by said heater, wherein the oxidizing gas supplying portion includes an oxidizing gas introducing pipe and at least one of pump and injector;
   a reducing gas supplying portion which supplies a reducing gas to said catalyst for purifying exhaust gas heated by said heater, wherein the reducing gas supplying portion includes a reducing gas introducing pipe and at least one of pump and injector;
   a switching valve which switches over from driving of said oxidizing gas supplying member to driving of said reducing gas supplying member, and from driving of said reducing gas supplying member to driving of said oxidizing gas supplying member; and
   a controller including programming configured to detect stop of fuel supply, to control the heater to heat said catalyst at the time of stopping fuel supply to control the switching valve to switch over from driving of said reducing gas supplying portion to driving of said oxidizing gas supplying portion, and from driving of said oxidizing gas supplying portion to driving of said reducing gas supplying portion at the time of stopping fuel supply to a vehicle engine, and to regenerate said catalyst at the time of stopping fuel supply to the vehicle engine.

2. An apparatus for regenerating a catalyst for purifying exhaust gas, comprising:
   an oxidizing gas supplying portion which supplies an oxidizing gas to said catalyst for purifying exhaust gas, wherein the oxidizing gas supplying portion includes an oxidizing gas introducing pipe and at least one of pump and injector;
   a reducing gas supplying portion which supplies a reducing gas to said catalyst for purifying exhaust gas, wherein the reducing gas supplying portion includes a reducing gas introducing pipe and at least one of pump and injector;
   a plasma generator which generates discharge plasma in said oxidizing gas or said reducing gas existing between said oxidizing gas supplying member and said reducing gas supplying member, and said catalyst for purifying exhaust gas; and
   a controller including programming configured to detect stop of fuel supply, to control the oxidizing gas supplying portion to supply an oxidizing gas turned into plasma to said catalyst and then to control the reducing gas supplying portion to supply a reducing gas turned into plasma to said catalyst at the time of stopping fuel supply to a vehicle engine, and to regenerate said catalyst at the time of stopping fuel supply to the vehicle engine.

3. The apparatus for regenerating a catalyst for purifying exhaust gas set forth in claim 1, wherein said catalyst for purifying exhaust gas comprises:
   a support which includes at least ceria; and
   a platinum loaded onto said support.

4. A method for regenerating a catalyst for purifying exhaust gas at the time of stopping fuel supply to a vehicle engine, comprising the successive steps of:
   detecting stop of fuel supply to the vehicle engine;
   heating said catalyst for purifying exhaust gas including a noble metal;
   oxidizing said noble metal by supplying an oxidizing gas to said heated catalyst for purifying exhaust gas; and
   reducing said noble metal under oxidized condition by supplying a reducing gas to said heated catalyst for purifying exhaust gas,
   wherein the successive steps are controlled by a controller including programming configured to detect stop of fuel supply, to control heating of said catalyst at the time of stopping fuel supply, to detect the temperature of said catalyst, to control switching between supplying the oxidizing gas and supplying the reducing gas, and to regenerate said catalyst at the time of stopping fuel supply to the vehicle engine.

5. The method for regenerating a catalyst for purifying exhaust gas set forth in claim 4, wherein said supplying an oxidizing gas or said supplying a reducing gas includes using a reverse-driving power when said engine is reverse-driven by rotation of a vehicle wheel at the time of stopping fuel supply.

6. The method for regenerating a catalyst for purifying exhaust gas set forth in claim 4, wherein said oxidizing step is carried out under the condition that said catalyst for purifying exhaust gas is heated within 400° C.~800° C.

7. The method for regenerating a catalyst for purifying exhaust gas set forth in claim 4, wherein said reducing step is carried out under the condition that said catalyst for purifying exhaust gas is heated to 100° C. or above.

8. The method for regenerating a catalyst for purifying exhaust gas set forth in claim 4, wherein said oxidizing gas includes 2% or more oxygen gas.

9. A method for regenerating a catalyst for purifying exhaust gas at the time of stopping fuel supply to a vehicle engine, comprising the successive steps of:
   detecting stop of fuel supply to the vehicle engine;
   oxidizing a noble metal by supplying an oxidizing gas activated by a discharge plasma to a catalyst for purifying exhaust gas including said noble metal; and reducing said noble metal under oxidized condition by supplying a reducing gas activated by a discharge plasma to said catalyst for purifying exhaust gas, wherein the successive steps are controlled by a controller including programming configured to detect stop of fuel supply, to control supplying the oxidizing gas turned into plasma to said catalyst and then supplying the reducing gas turned into plasma to said catalyst, and to regenerate said catalyst at the time of stopping fuel supply to the vehicle engine.

10. The method for regenerating a catalyst for purifying exhaust gas set forth in claim 4, wherein said catalyst for purifying exhaust gas comprises:
a support which includes at least ceria; and
a platinum loaded onto said support.

11. The apparatus for regenerating a catalyst for purifying exhaust gas set forth in claim 2, wherein said catalyst for purifying exhaust gas comprises:
a support which includes at least ceria; and
a platinum loaded onto said support.

12. The method for regenerating a catalyst for purifying exhaust gas set forth in claim 9, wherein said catalyst for purifying exhaust gas comprises:
a support which includes at least ceria; and
a platinum loaded onto said support.

* * * * *